(12) United States Patent
Ciccocioppo (10) Patent No.: US 12,121,982 B2
(45) Date of Patent: Oct. 22, 2024

(54) DRILL GUIDE TEMPLATE AND METHOD OF USE

(71) Applicant: KITCHEN SAVER, Etters, PA (US)

(72) Inventor: Michael A. Ciccocioppo, New Cumberland, PA (US)

(73) Assignee: KITCHEN SAVER, Etters, PA (US)

( * ) Notice: Subject to any disclaimer, the term of this patent is extended or adjusted under 35 U.S.C. 154(b) by 453 days.

(21) Appl. No.: 17/652,105

(22) Filed: Feb. 23, 2022

(65) Prior Publication Data
US 2023/0264269 A1    Aug. 24, 2023

(51) Int. Cl.
*B23B 47/28*    (2006.01)
*A47B 95/02*    (2006.01)
*E05B 17/06*    (2006.01)

(52) U.S. Cl.
CPC ............ *B23B 47/287* (2013.01); *A47B 95/02* (2013.01); *E05B 17/06* (2013.01)

(58) Field of Classification Search
CPC ............................. B23B 47/287; E05B 17/06
USPC ........................................ 33/194, 197, 562
See application file for complete search history.

(56) References Cited

U.S. PATENT DOCUMENTS

| | | | | |
|---|---|---|---|---|
| 2,609,021 A * | 9/1952 | Griffith | ...................... | B27F 5/12 408/72 R |
| 3,082,800 A * | 3/1963 | Soss | .................... | E05D 11/0009 33/197 |
| 4,130,930 A * | 12/1978 | Webster | ................... | E05B 17/06 29/466 |
| 4,141,192 A * | 2/1979 | Augustine | ........... | E04F 21/0023 52/749.1 |
| 4,502,232 A * | 3/1985 | Broders | ............. | A47G 27/0487 33/562 |
| 4,578,875 A * | 4/1986 | Vertin | ...................... | G01B 3/14 33/562 |
| 4,670,990 A * | 6/1987 | Horvath | ................... | B25H 7/00 D10/64 |
| 4,715,125 A * | 12/1987 | Livick | ..................... | E05B 17/06 33/197 |
| 4,787,432 A * | 11/1988 | Williams | ................... | B27F 1/12 144/144.1 |
| 4,813,826 A * | 3/1989 | Riedel | ...................... | B27F 5/12 33/197 |
| 5,114,285 A | 5/1992 | Brydon | | |
| 5,318,394 A | 6/1994 | Pierce et al. | | |
| 5,573,352 A * | 11/1996 | Matadobra | ............ | B23B 47/287 408/72 R |
| 5,620,216 A * | 4/1997 | Fuller | ..................... | E05C 9/185 292/142 |

(Continued)

FOREIGN PATENT DOCUMENTS

GB            2301052 A        11/1996

*Primary Examiner* — George B Bennett
(74) *Attorney, Agent, or Firm* — McNees Wallace & Nurick LLC (57) ABSTRACT

In an exemplary embodiment, a template for locating and drilling one or more holes in a door is provided. The template may include a body member having a first side portion, a second side portion, and a middle portion. The middle portion can be between the first side portion and the second side portion forming a profile that is configured to cooperatively engage with a portion of the door. The profile can include at least one curved portion to correspond to a curved portion of the portion of the door.

20 Claims, 9 Drawing Sheets

(56) References Cited

U.S. PATENT DOCUMENTS

| | | | | |
|---|---|---|---|---|
| 5,960,554 A * | 10/1999 | Kamykowski | ............ | G01B 3/14 33/562 |
| 6,077,000 A * | 6/2000 | Gibbons | ................. | B25H 7/02 33/645 |
| 6,193,449 B1 * | 2/2001 | Diaz | .................... | B23B 49/023 408/72 R |
| 6,317,996 B1 * | 11/2001 | Myers | ...................... | E05F 3/00 33/562 |
| 7,003,889 B1 * | 2/2006 | Luciani | .................. | E05B 17/06 33/562 |
| 7,117,639 B2 * | 10/2006 | Abdella | .................. | E05B 17/06 49/382 |
| 7,195,429 B2 * | 3/2007 | Dods | ................. | B23Q 11/0046 408/67 |
| 7,246,449 B2 * | 7/2007 | Pierson | .................. | E05B 17/06 33/562 |
| 7,252,463 B2 * | 8/2007 | Valdez | ................ | E05D 11/0009 408/241 B |
| 7,266,901 B2 * | 9/2007 | Taniguchi | ............... | B25B 23/02 33/1 G |
| 7,421,791 B2 * | 9/2008 | Adkins | ................. | B23B 47/287 33/197 |
| 7,549,827 B2 * | 6/2009 | Siegfried | ................. | B25H 7/00 33/562 |
| 8,443,523 B2 * | 5/2013 | Lam | ..................... | B23B 47/287 30/167.1 |
| 8,621,717 B2 * | 1/2014 | Liermann | ............... | E05D 3/186 16/366 |
| 8,904,713 B1 * | 12/2014 | Anderson | ........... | E05B 17/2084 49/460 |
| 9,249,616 B2 * | 2/2016 | Ball | .......................... | E06B 3/58 |
| 9,376,835 B2 * | 6/2016 | Schildwachter | ........ | E05B 17/06 |
| 9,382,733 B2 * | 7/2016 | Duong | ................... | B60J 5/0463 |
| 9,539,650 B2 * | 1/2017 | Frick | ...................... | B23B 47/287 |
| 10,767,390 B2 * | 9/2020 | Ray | ......................... | B23B 47/288 |
| 11,619,054 B2 * | 4/2023 | Skatzka | .............. | E04F 21/0076 33/562 |
| 2003/0172535 A1 * | 9/2003 | Grizzle | .................... | E05B 17/06 33/194 |
| 2003/0217525 A1 * | 11/2003 | Keith | ...................... | E06B 1/006 52/710 |
| 2005/0129472 A1 * | 6/2005 | Liu | ......................... | E05B 17/06 408/115 R |
| 2008/0265590 A1 * | 10/2008 | Bodily | ................ | E05B 15/0205 29/700 |
| 2008/0298911 A1 * | 12/2008 | Platt | ....................... | B23B 47/287 408/1 R |
| 2011/0064531 A1 * | 3/2011 | Osborne | ................. | B23B 49/023 408/103 |
| 2014/0133929 A1 * | 5/2014 | Smith | ....................... | B27F 5/12 408/115 R |
| 2018/0178640 A1 * | 6/2018 | Nagai | ....................... | E06B 7/2305 |
| 2019/0352949 A1 | 11/2019 | Liddle | | |
| 2019/0352950 A1 | 11/2019 | Liddle | | |
| 2019/0368248 A1 | 12/2019 | Liddle | | |
| 2019/0368249 A1 | 12/2019 | Liddle | | |
| 2022/0193792 A1 * | 6/2022 | Harvey | .................... | B25H 7/02 |
| 2023/0287706 A1 * | 9/2023 | Fraser | ....................... | B27F 5/12 |
| 2024/0066746 A1 * | 2/2024 | Hall | ........................ | B27F 5/12 |

* cited by examiner

DRILL GUIDE TEMPLATE AND METHOD OF USE

TECHNICAL FIELD

The present disclosure relates to a drill guide template. More specifically, the present disclosure is directed to a drill guide template for drilling holes in cabinet doors that correctly positions door hardware, such as knobs and handles.

BACKGROUND

Door hardware, such as door knobs and handles, for cabinetry requires drilling holes through a door of the cabinetry to install bolts and properly mount the door hardware. Typically, hardware templates or jigs have been utilized to remove guesswork of installing the door hardware at its proper position. These templates or jigs can be adjustable to fit various types of doors. However, these templates or jigs require manual setup steps, such as exact and proper measurements, which allows for user's mistakes and errors. This in turn produces holes at incorrect positions and ruins an otherwise fine product. In addition, these templates are made up of multiple (sliding) parts, which introduces possible points of failure, e.g., movement of parts, breakage, wear during use, etc. The templates are also generally made from different materials, which introduces complexity in manufacturing. Finally, these templates generally require additional equipment and/or tools, such as a clamp, to hold the template against the door while drilling the holes and/or measurement tools either prior to or during use to set the hole locations. This in turn creates additional assembly time and difficulties in installing the door hardware.

Moreover, these templates are designed to only operate on flat surfaces. In other words, most current cabinet doors have rails (or framing) that surround a center panel. The rails of these cabinet doors can have profiles that are planar or flat. However, conventional templates cannot operate when the profile of the rails of the door contains curved portions (i.e., raised rails) as conventional templates cannot maintain a secure, stable workpiece against the door.

In view of the problems associated with conventional templates for installing hardware for cabinetry doors, there remains a need to provide a template that uses dimensions and design features of various door styles to assure that the holes are drilled in precisely the right place for each unique style door.

SUMMARY

In an exemplary embodiment, a template for locating and drilling one or more holes in a door is provided. The template may include a body member having a first side portion, a second side portion, and a middle portion. The middle portion can be between the first side portion and the second side portion forming a profile that is configured to cooperatively engage with a portion of the door. The profile can include at least one curved portion to correspond to a curved portion of the portion of the door.

In another exemplary embodiment, a method for locating a target point in a door is provided. The method includes providing a template having at least a middle portion that includes a profile, positioning the middle portion of the template to a portion of the door, translating the template along the portion of the door, and locating the target point.

In another exemplary embodiment, a kit for locating and drilling one or more holes in a door is provided. The kit may include a first template having a first profile and a second template having a second profile. The second profile is different than the first profile. The first template can be configured to engage a portion of a door having a shape that cooperatively engages the first profile. The second template can be configured to engage a portion of a door having a shape that cooperatively engages the second profile.

Other features and advantages of the present invention will be apparent from the following more detailed description of the preferred embodiment which illustrates, by way of example, the principles of the invention.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION

A drill guide template, according to the present disclosure, is a device for drilling hole(s) in cabinet doors to correctly position door hardware, such as knobs and handles. The template uses dimensions and physical design features of the cabinet doors, particularly, a framing portion of the door, to assure holes are drilled in a precise manner and in a correct position. The template is designed to cooperatively engage (e.g., mate, match, join, correspond) with the framing portion having a distinct profile. This ensures that a user does not use the wrong template for a particular door style. With conventional templates or jigs, the user must measure the dimensions of the door and still adjust the template for installation of the hardware. This requires additional assembly and installation time, and is prone to measurement mistakes and user errors. By contrast, the template of the present disclosure has no moving parts and merely uses physical features of the door in a way that is unique to that particular door and will only engage correctly to that particular door having the unique physical feature or profile. Hence, if the wrong template is used, it will not fit with that particular door, thus eliminating mistakes drilling holes in the wrong location. More specifically, the template uses only a portion of the door (i.e., framing portion) and its unique physical features (or profile) to determine where the drill guide holes are to be located. The template is ultra-simple to use and manufacture.

Figure 1:
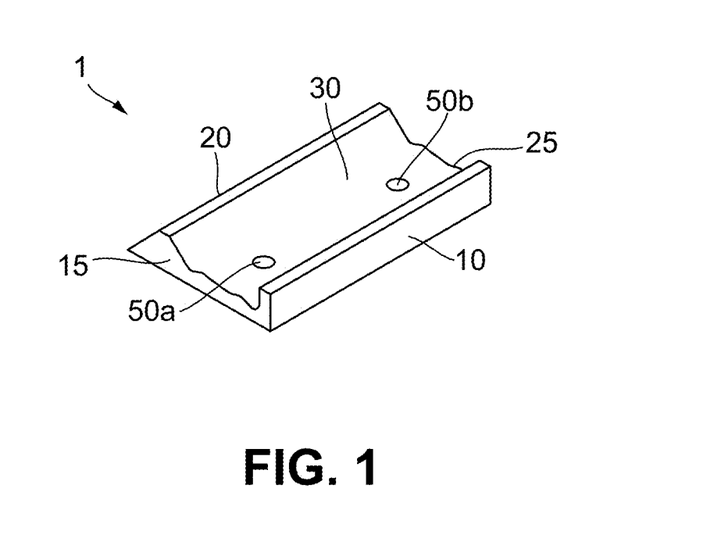
FIG. 1 is a perspective view of a template, according to an example embodiment of the present disclosure.

FIG. 1 illustrates a drill guide template 1 for locating target points for drilling holes in a cabinet door 5 and mounting a door hardware, such as a knob, a handle, and the like, according to an example embodiment. In some implementations, the template 1 is a block-like body being of a substantially rectangular shaped member. The template 1 can be constructed from plastic materials or polymers, such as, but not limited to, polyethylene terephthalate (PET), high density polyethylene (HDPE), low density polyethylene (LDPE), polypropylene (PP), and/or polyvinyl chloride (PVC). Due to the inherent and mechanical properties of plastic (e.g., density, hardness, etc.), the template 1 can be light weight and durable to withstand external force (e.g., impact, drops, stress, and the like) applied to/on the template 1. In other implementations, the template 1 can be made from other materials, such as, hard rubber. In other implementations, the template 1 can be made from a combination of plastic and rubber.

The template 1 can be unitarily made from a single piece of material. For example, the template 1 can be manufactured by an injection molding process forming a single unitary member. In other implementations, the template 1 can be made from separate pieces. For example, the template 1 can be made from separate pieces and fastened together using fasteners, such as, for example, screws, bolts, anchors, rivets, etc. and/or adhesives, such as, for example, glue, tape, etc. In other implementations, a layer (not shown) made of same material as the template 1 or made from a different material, such as, rubber, can be attached to the template 1. For example, the layer can be formed on an inner surface of the template 1. This layer can reduce against wear-and-tear usage of the template 1 and/or provide extra protection to a surface of the door 5.

Figure 2A:
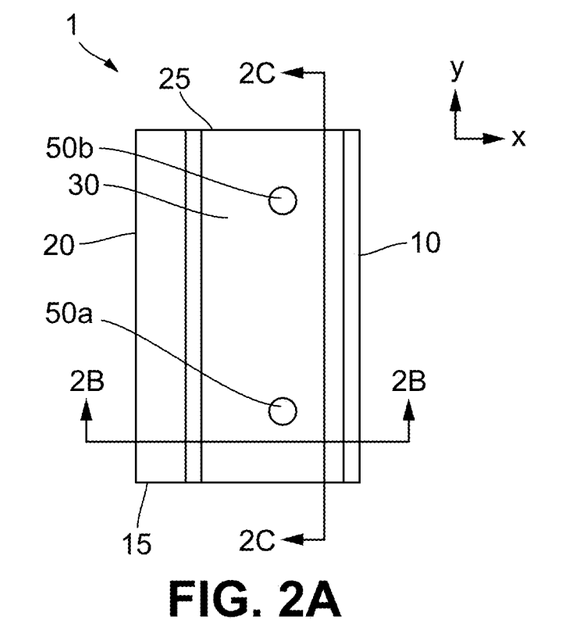
FIG. 2A is a top view of the template of FIG. 1, according to an example embodiment of the present disclosure.

Referring to FIG. 2A, the template 1 includes a first side portion 10, a second side portion 20 opposite the first side portion 10, a first end 15, and a second end 25 opposite the first end 15. The first side portion 10 and the second side portion 20 run parallel with each other. The first end 15 and the second end 25 run parallel with each other. Between the first side portion 10 and the second side portion 20, a middle portion 30 is formed. That is, the middle portion 30 is an area of the template 1 that engages or contacts with a portion of the door 5 for engagement.

The middle portion 30 has a plurality of through guide holes 50a, 50b for drilling holes in the cabinet door 5 and mounting the hardware knob or handle. In one implementation, the middle portion 30 includes two guide holes 50 to indicate the locations of the holes in the door 5. It should be appreciated that more or less than two guide holes 50 may be formed in the template 1 dependent upon the specific hardware to be installed and intended design.

Figure 2B:
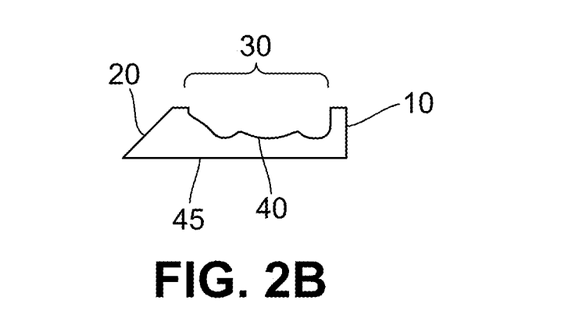
FIG. 2B is a cross-sectional view of the template of FIG. 2A, according to an example embodiment of the present disclosure.
Figure 2C:
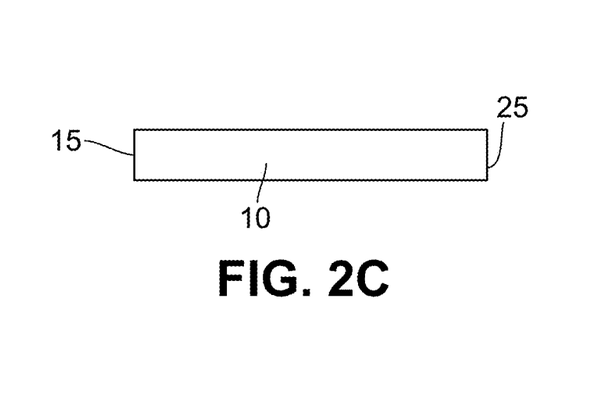
FIG. 2C is a cross-sectional view of the template of FIG. 2A, according to an example embodiment of the present disclosure.

In one example implementation, the template 1 may include two guide holes 50a, 50b in the middle portion 30 that are 3 in. apart for a hardware handle containing 3 in. hole bores. The template 1 can be 5 in. in total length (i.e., y-direction), where a distance from a center of the guide hole 50a to the first end 15 is 1 in. and a center of the guide hole 50b to the second end 25 is 1 in., and a distance between the two guide holes 50a, 50b is 3 in. Additionally, in this implementation, as shown in FIG. 2B, the middle portion 30 can be 2 in. in total in a width direction (i.e., x-direction), in which a distance from the center of the guide hole 50a or 50b to the first side portion 10 is 0.875 inches and a distance from the center of the guide hole 50a or 50b to the second side portion 20 is 1.125 in., totaling 2.0 in. in the middle portion 30. This enables the template 1 to engage with the physical feature of the door, having the same width (and profile) as the template 1. In this case, because the middle portion 30 of the template 1 is 2 in. wide, the physical feature of the door, in particular, the framing member, must also be 2 in. wide, such that engagement can only occur between the template 1 and the door 5. This ensures that the template 1 operates only with the door 5 having the similar profile as the template 1, and avoids using other templates with different profiles.

It should be appreciated that the template 1 can be designed and customed to other dimensions and sizes to accommodate the intended door 5. That is, the placement of the guide holes 50a, 50b, the number of guide holes 50a, 50b, the dimension/size of the guide holes 50a, 50b, etc. may vary dependent upon the intended design and hardware product to be installed.

Figure 6A:
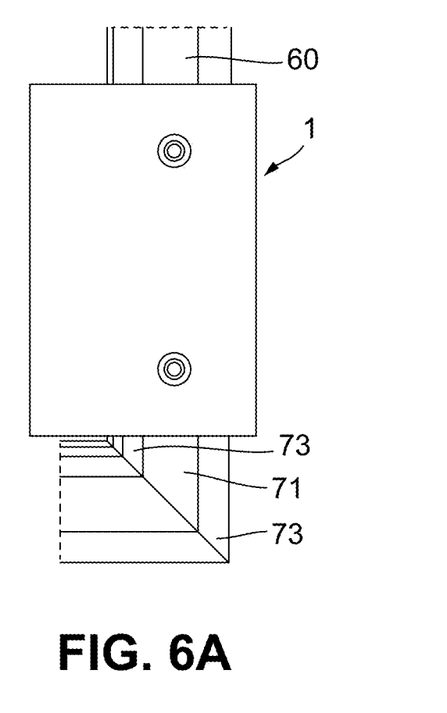
FIGS. 6A and 6B are schematic views of the template of FIG. 1 in use, according to an example embodiment of the present disclosure.
Figure 6B:
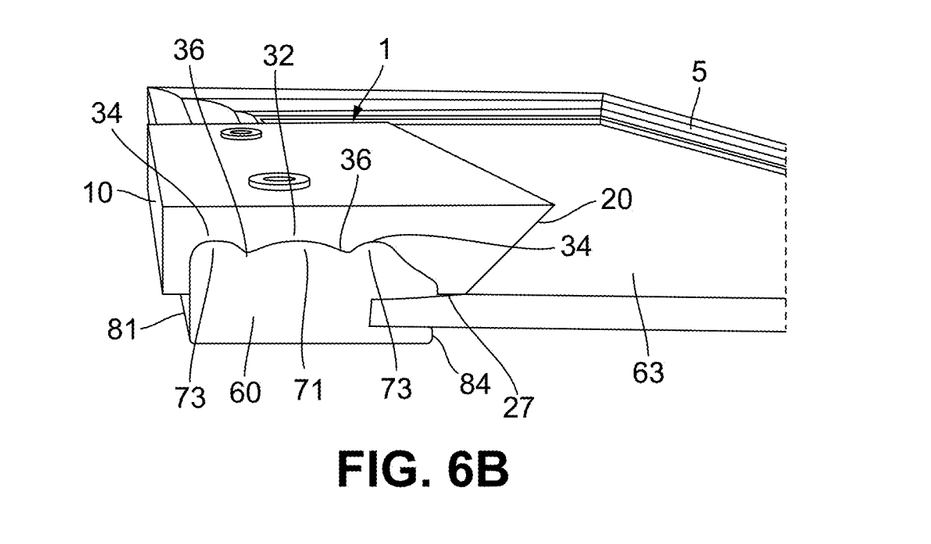

Referring to FIG. 2B, the template 1 has a top-side portion 40 and a bottom-side portion 45. In use, the top-side portion 40, constituting also as an inner surface side, directly engages the door 5, and the bottom-side portion 45, constituting also an outer surface side, does not directly engage the door 5. In one implementation, the bottom-side portion 45 is substantially planar or flat, and the top-side portion 40 is non-planar (i.e., contains curves, non-straight segments). The top-side portion 40 includes the middle portion 30 surrounded by the first side portion 10 on one side and the second side portion 20 on the other side. In other words, when viewed from a side of the template 1, the middle portion 30 is formed lower than the first side portion 10 and second side portion 20, forming a valley-like structure. Hence, the middle portion 30 has a side profile that corresponds (i.e., matches, mates) to a portion of the cabinet door 5 having a specific physical feature. More specifically, the side profile of the middle portion 30 has a shape that corresponds to a physical feature (i.e., shape) of a framing portion 60 of the cabinet door 5, as shown in FIGS. 6A and 6B. For example, in one implementation, the middle portion 30 includes a lowered center portion 32 that is configured to cooperatively engage with a center raised portion 71 of the framing portion 60 of the door 5, and two lowered portions 34 that are configured to cooperatively engage with raised portions 73 of the framing portion 60 of door 5. To describe in a different manner, the lowered portions 32, 34 can be defined as 'valleys' having a lower side profile and portions 36 located between the lowered portions 32, 34 can be defined as 'peaks' having a higher side profile. Due to the particular physical feature of the framing portion 60, the template 1 can only engage correctly to that specific door having that particular physical feature. This enables the user to create holes quickly and accurately in the door 5 for installing the hardware knobs or handles. That is, the user can quickly place the template 1 against the door 5 and drill holes accurately without any measurements, saving time and effort, and avoiding mistakes. As such, the installed hardware on the door is more consistent and uniform in appearance.

Figure 5A:
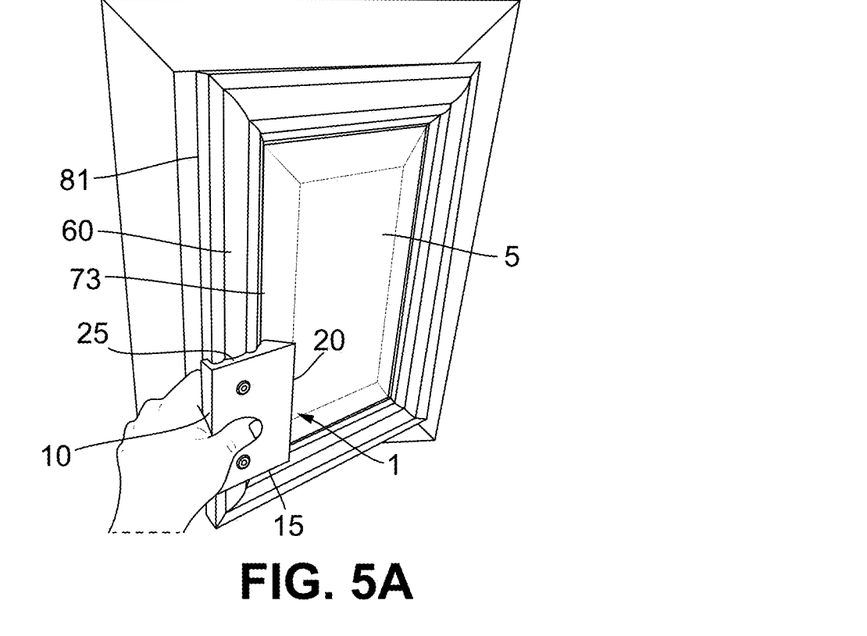
FIG. 5A is a schematic view of the template in use for a right-hinged door, according to an example embodiment of the present disclosure.
Figure 5B:
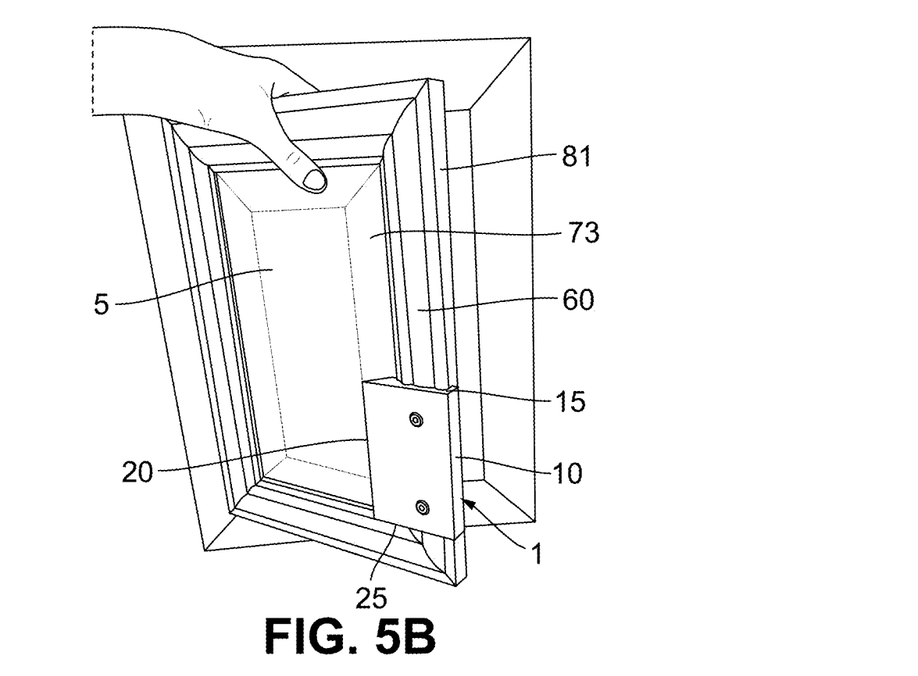
FIG. 5B is a schematic view of the template in use for a left-hinged door, according to an example embodiment of the present disclosure.

In operation, as shown in FIGS. 5A and 5B, the template 1 is initially placed over an edge 81 of the door 5. More specifically, the middle portion 30 of the template 1 is placed on top of the framing portion 60 of the door 5, causing the bottom side portion 45 to face away from the door 5. This also causes the first side portion 10 to face exteriorly away from the edge 81 of the door 5 and the second side portion 20 to face interiorly towards the door 5. To describe in a different manner, a (inner) surface of the first side portion 10 will be adjacent to and running parallel with the edge 81 of the door 5. At the other side of the template 1, i.e., the second side portion 20, an end 27 of the second side portion 20 will contact an (inner) edge 84 of the framing portion 60 that runs along a center panel 63 of the door 5, as shown in FIG. 6B. In one implementation, the second side portion 20 is angled towards the edge 84 of the framing portion 60. This ensures that the template 1 is the proper template and provides a tight fit against the framing portion 60. The angled second side portion 20 may also facilitate with handling of the template 1 by the user. More specifically, the angled surface helps the user's fingers to easily grasp the template 1 by placing the fingers underneath the second side portion 20. The template 1 may be used for right-hinged doors (as shown in FIG. 5A) or left-hinged doors (as shown in FIG. 5B). For any configuration, the template 1 may be used by merely flipping over the template 1 to either side of the door 5 for engagement.

To ensure that the template 1 is the proper template for door 5, the profile of the middle portion 30 should match the physical feature of the framing portion 60, i.e., no gaps or openings are provided between an interface of the template 1 and the frame 60. Moreover, another determination to ensure that the correct template is used, the template 1 should slide easily along the framing portion 60 without any (lateral) movements.

Further, in order to ensure that the template 1, for each use, is positioned at the same and exact location of the door 1 for drilling, the template 1 abuts against a portion of the framing portion 60. For example, for right-hinged doors (FIG. 5A), the user slides the template 1 along the framing portion 60 until the first end 15 of the template 1 abuts against an inner corner (i.e., lower left) of the framing portion 60. For left-hinged doors (FIG. 5B), the user slides the template 1 along the framing portion 60 until the second end 25 of the template 1 abuts against an inner corner (i.e., lower right) of the framing portion 60. This ensures that the hardware handle is positioned for every door 5 at the same and exact location, creating a consistent appearance. This also requires no measuring at pre-stage and/or during installation of the hardware, saving considerable amount of time.

Figure 5C:
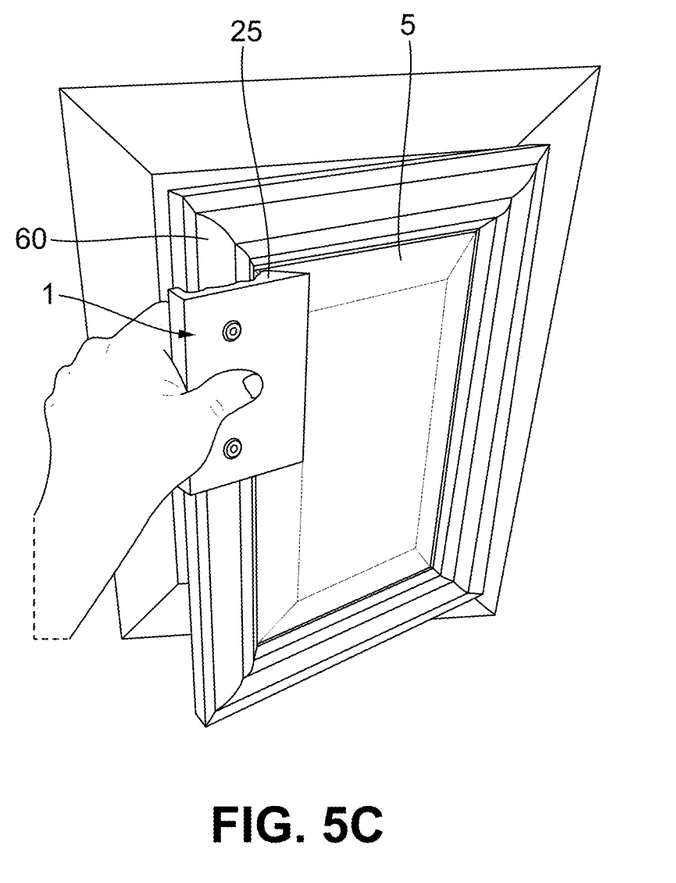
FIG. 5C is a schematic view of the template in use for a right-hinged door, according to another example embodiment of the present disclosure.

In other implementations, the template 1 can be used to install the hardware handle at an upper portion of the door 5. This is performed by sliding the template 1 up towards the upper portion of the door 5 while the template 1 is engaged to the framing portion 60. For example, for right-hinged doors, the template 1 can slide along the framing portion 60 and abut against the upper portion of the framing portion 60, i.e., the second end 25 abuts against the upper corner (i.e., upper left) of the framing portion 60 for placement of the hardware at the upper left side of the door 5, as shown in FIG. 5C. Although not shown, for left-hinged doors, the template 1 can also be used at the upper right corner of framing portion 60 for placement of the hardware at the upper right side of the door 5 using the similar method as described above.

In other implementations, the template 1 can be used to install the hardware handle in a horizontal configuration at an upper portion of the door 5. For example, for right-hinged doors, the template 1 is turned 90 degrees and placed on top of the framing portion 60 so as to engage the physical features of the framing portion 60. Hence, the first end 15 of the template 1 abuts the inner upper corner (i.e., upper left) and in position for drilling holes in the horizontal configuration. Similarly, the template 1 can be used to install the hardware handles in the horizontal configuration for left hinged doors using the same method described above. Additionally, the template 1 can also be used to install the hardware handles in the horizontal configuration at a lower portion of the door 5 for right/left hinged doors using the same method described above. Overall, the template 1 can be used to install the hardware near all four corners of the door 5, without additional equipment or tools and/or measurements.

Once the template 1 is placed against the respective corners of the framing portion 60, the user may mark the target point and start drilling holes using a power tool, for example. In some implementations, the user may drill a pilot hole prior to drilling the actual hole size that matches the hardware hole size.

In some implementations, guide holes 50a, 50b in template 1 can be reinforced with an additional material to surround or cover within the guide holes 50a, 50b. For example, the guide holes 50a, 50b can be reinforced with a metal material. The metal material ensures a drill bit from the power tool does not damage the guide holes 50a, 50b by cutting or breaking the holes or making the holes larger, causing misalignment or error in measurement.

In some implementations, on a surface of template 1, i.e., the bottom surface 45, a marking (not shown) can be included around the guide holes 50a, 50b to facilitate with alignment and/or to easily mark the target area for drilling the holes. For example, a circular marking may be used around the guide holes 50a, 50b to quickly identify the location of the guide holes 50a, 50b by the user. In another example, multiple concentric markings around the guide holes 50a, 50b may be employed. The marking may be colored or multi-colored.

Figure 3:
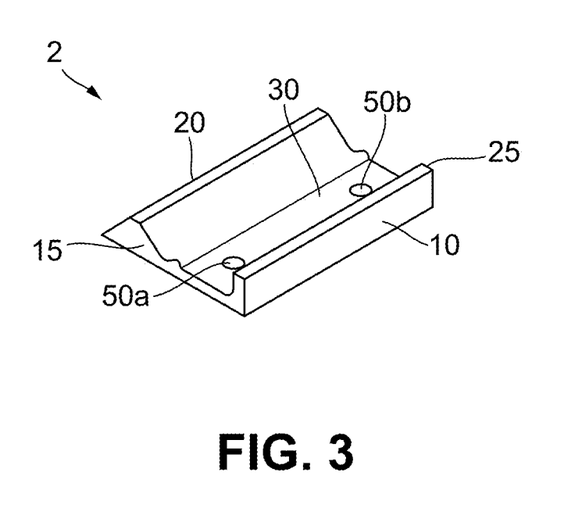
FIG. 3 is a perspective view of a template, according to another example embodiment of the present disclosure.
Figure 7A:
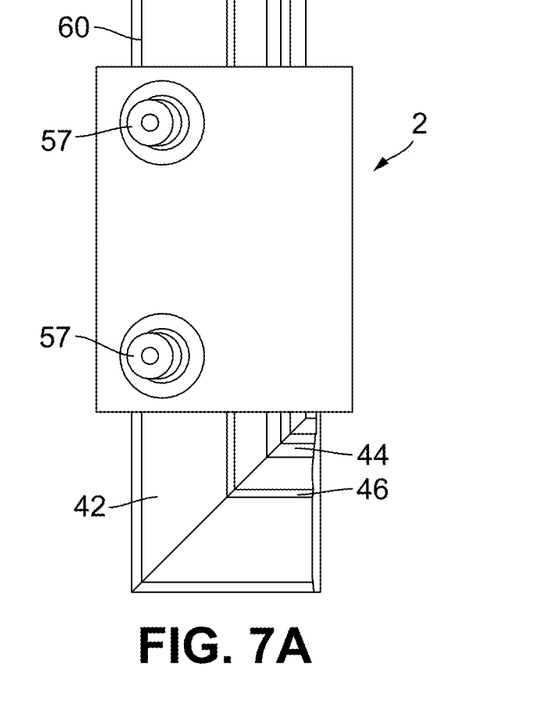
FIGS. 7A and 7B are schematic views of the template of FIG. 3 in use, according to an example embodiment of the present disclosure.
Figure 7B:
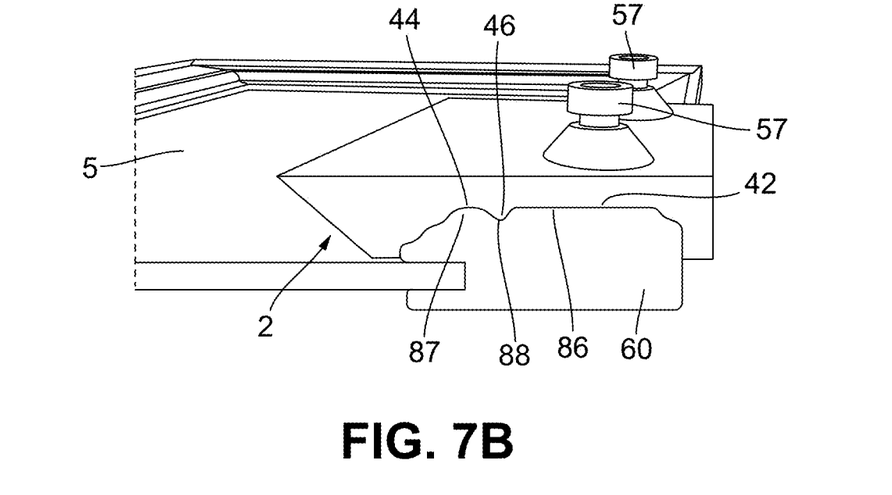

FIG. 3 is a perspective view of a template 2 according to another example embodiment. Similar features illustrated in FIG. 3 having same reference numerals of FIG. 1 will not be discussed in detail herein. Template 2 of FIG. 3 is similar to template 1 of FIG. 1, except for the middle portion 30 having a different profile. In this case, the template 2 is designed to engage a physical feature of the framing portion 60 having one valley, as shown in FIGS. 7A and 7B. For example, the middle portion 30 of template 2 includes a first lower portion 42 that is configured to cooperatively engage with a raised portion 86 of the framing portion 60 of the door 5, a second lower portion 44 that is configured to cooperatively engage with a raised portion 87 of the framing portion 60 of the door 5, and an upper portion 46 that is configured to cooperatively engage with a lower portion 88 of the framing portion 60 of door 5.

In comparison to template 1 of FIG. 1, template 2 is smaller in length (i.e., y-direction) but larger in width (i.e., x-direction). In one implementation, for example, the template 2 can be 4.5 in. in total length (i.e., y-direction), where a distance from a center of the guide hole 50a to the first end 15 is 0.75 in. and a center of the guide hole 50b to the second end 25 is 0.75 in., and a distance between the two guide holes 50a, 50b is 3 in. Additionally, in this implementation, the middle portion 30 is 2.25 in. in a width direction (i.e., x-direction), where a distance from the center of the guide hole 50a or 50b to the first side portion 10 is 0.75 inches and a distance from the center of the guide hole 50a or 50b to the second side portion 20 is 1.5 in., totaling 2.25 in. in the middle portion 30.

Figure 8:
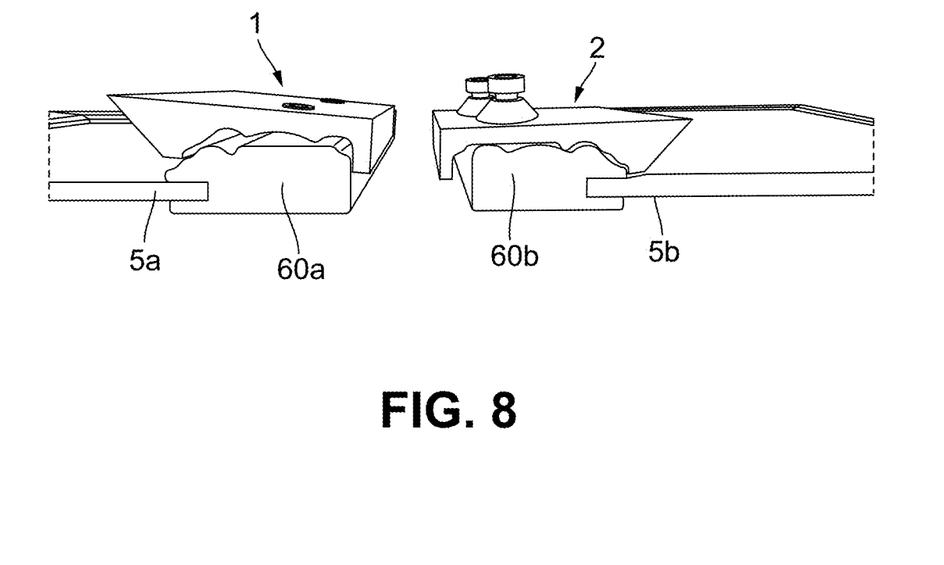
FIG. 8 is a schematic view of different templates in non-conforming use, according to an example embodiment of the present disclosure.
Figure 9:
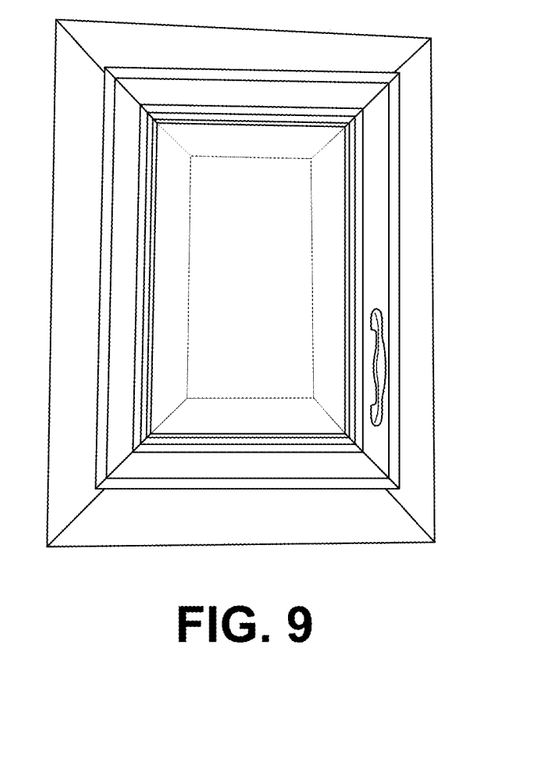
FIG. 9 is a schematic view of a cabinet door with a door hardware installed, according to an example embodiment of the present disclosure.

Due to the different dimensions and profiles, template 2 will not work with a door having the profile of template 1. In other words, the profile of template 2 will not match the physical features of the door 5 that uses template 1. As such, the user cannot grab the wrong template and hence, eliminating mistakes drilling holes for wrong workpiece. To further illustrate, FIG. 8 shows template 1 positioned over door 5a having a first physical feature (profile) in the framing portion 60a and template 2 positioned over door 5b having a second physical feature (profile) in the framing portion 60b, wherein the second framing portion feature 60b of door 5b is different than the first framing portion feature 60a of door 5a. As clearly shown, the profile of template 1 does not match the physical feature of framing portion 60a of door 5a and the profile of template 2 does not match the physical feature of framing portion 60b of door 5b. As such, gaps and openings are presented between the templates 1, 2 and the respective doors 5a, 5b, indicating that wrong templates are used with the wrong doors. Otherwise, template 1 will properly engage with the second framing portion feature 60b of door 5b and template 2 will properly engage with the first framing portion feature 60a of door 5a.

Figure 4A:
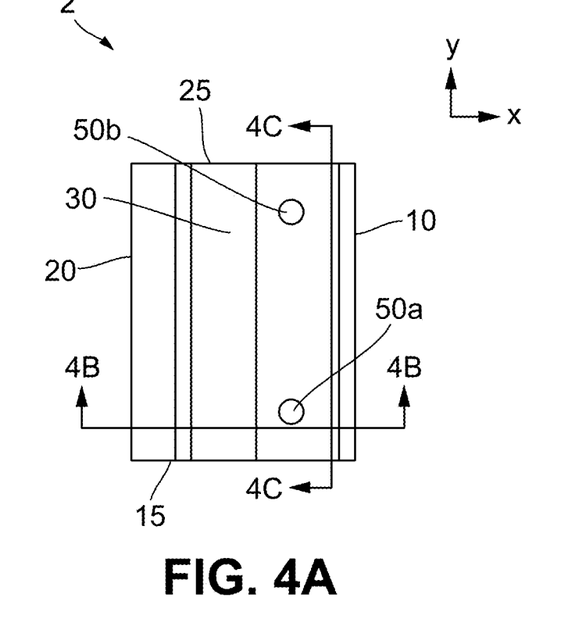
FIG. 4A is a top view of the template of FIG. 3, according to an example embodiment of the present disclosure.
Figure 4B:
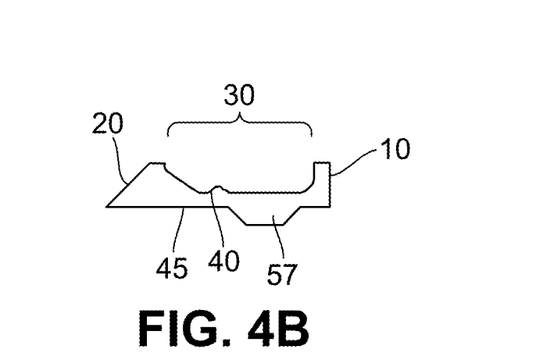
FIG. 4B is a cross-sectional view of the template of FIG. 4A, according to an example embodiment of the present disclosure.
Figure 4C:
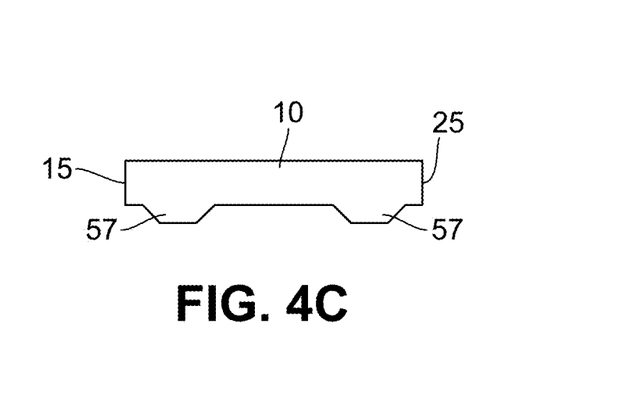
FIG. 4C is a cross-sectional view of the template of FIG. 4A, according to an example embodiment of the present disclosure.

Referring back to FIGS. 4A-4C, the template 2 includes a drill guide insert 57 for accommodating framing portions of doors that are larger, i.e., having higher profiles. The guide insert 57 is positioned at each guide holes 50a, 50b on the bottom side portion 45. In other words, the guide insert 57 is aligned co-axially with each of the guide holes 50a, 50b. In some implementations, the guide insert 57 can be integrally made with the template 2. In other implementations, the guide insert 57 can be separately made from the template 2 and inserted into the guide holes 50a, 50b. For example, the guide insert 57 includes screw threads that cooperatively engages with threads in the guide holes 50a, 50b. In other implementations, the guide insert 57 can be of different height to accommodate for different drill bit sizes.

In some implementations, the present disclosure can be embodied in a kit for locating and drilling one or more holes in a door. The kit includes a first template 1 having a first profile and a second template 2 having a second profile. The second profile is different than the first profile. Accordingly, the first template 1 can be configured to engage a portion of a door having a shape that cooperatively engages the first profile. The second template 2 can be configured to engage a portion of a door having a shape that cooperatively engages the second profile.

In other implementations, a third template having a third profile can be provided. The third profile of the third template is different than the first profile of the first template and the second profile of the second template. In yet other implementations, the kit can include three or more templates, each having different profiles, can be provided.

The articles "a" and "an," as used herein, mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A template for locating and drilling one or more holes in a door, comprising:
a body member having a first side portion, a second side portion, and a middle portion, the middle portion being between the first side portion and the second side portion forming a profile that is configured to cooperatively engage with a portion of the door,
wherein the profile includes at least one curved portion to correspond to a curved portion of the portion of the door.

2. The template of claim 1, wherein the portion of the door is a framing member, the framing member surrounds a center panel of the door.

3. The template of claim 2, wherein the body member is configured to translate along the framing member for locating a target point.

4. The template of claim 1, wherein the profile includes at least two or more curved portions that cooperatively engage with curved portions on the portion of the door.

5. The template of claim 1, wherein the profile includes a plurality of raised portions.

6. The template of claim 1, wherein the body member further comprises a first end and a second end, wherein:
the first end and the second end are perpendicular to the first side portion and the second side portion, and
at least one of the first end and the second end contacts the portion of the door.

7. The template of claim 1, wherein at least one of the first end and the second end contacts a framing member of the door to locate a target point.

8. The template of claim 1, wherein the middle portion include two or more holes.

9. The template of claim 8, further comprising a guide insert, wherein the guide insert is located on the body member.

10. The template of claim 9, wherein the guide insert is detachable from the body member.

11. The template of claim 9, wherein the guide insert corresponds with the two or more holes.

12. The template of claim 1, wherein at least one of the first side portion or the second side portion is angled.

13. A kit for locating and drilling one or more holes in a door, the kit comprising:
a first template having a first profile; and
a second template having a second profile being different than the first profile,
wherein the first template is configured to engage a portion of a door having a shape that cooperatively engages the first profile, and
wherein the second template is configured to engage a portion of a door having a shape that cooperatively engages the second profile.

14. The kit of claim 13, further comprising a third template having a third profile.

15. The kit of claim 13, wherein:
the first template has a first width, and
the second template has a second width, the second width being different than the first width.

16. A method of locating a target point on a door, comprising:
providing a template having at least a middle portion that includes a profile;
positioning the middle portion of the template to a portion of the door;
translating the template along the portion of the door; and
locating the target point to be marked.

17. The method of claim 16, wherein positioning the middle portion of the template includes positioning the middle portion of the template to a framing member of the door.

18. The method of claim 16, wherein translating the template along the portion of the door includes abutting an end portion of the template to an inner corner portion of the framing member.

19. The method of claim 16, wherein translating the template along the portion of the door further comprises sliding the template along the portion of the door until an end portion of the template abuts an inner corner portion of the door.

20. The method of claim 16, further comprises aligning a side portion of the template to an edge of the door.

* * * * *